Jan. 6, 1942.   E. W. N. BOOSEY   2,268,854
GREASE TRAP
Filed Dec. 27, 1940   2 Sheets-Sheet 2

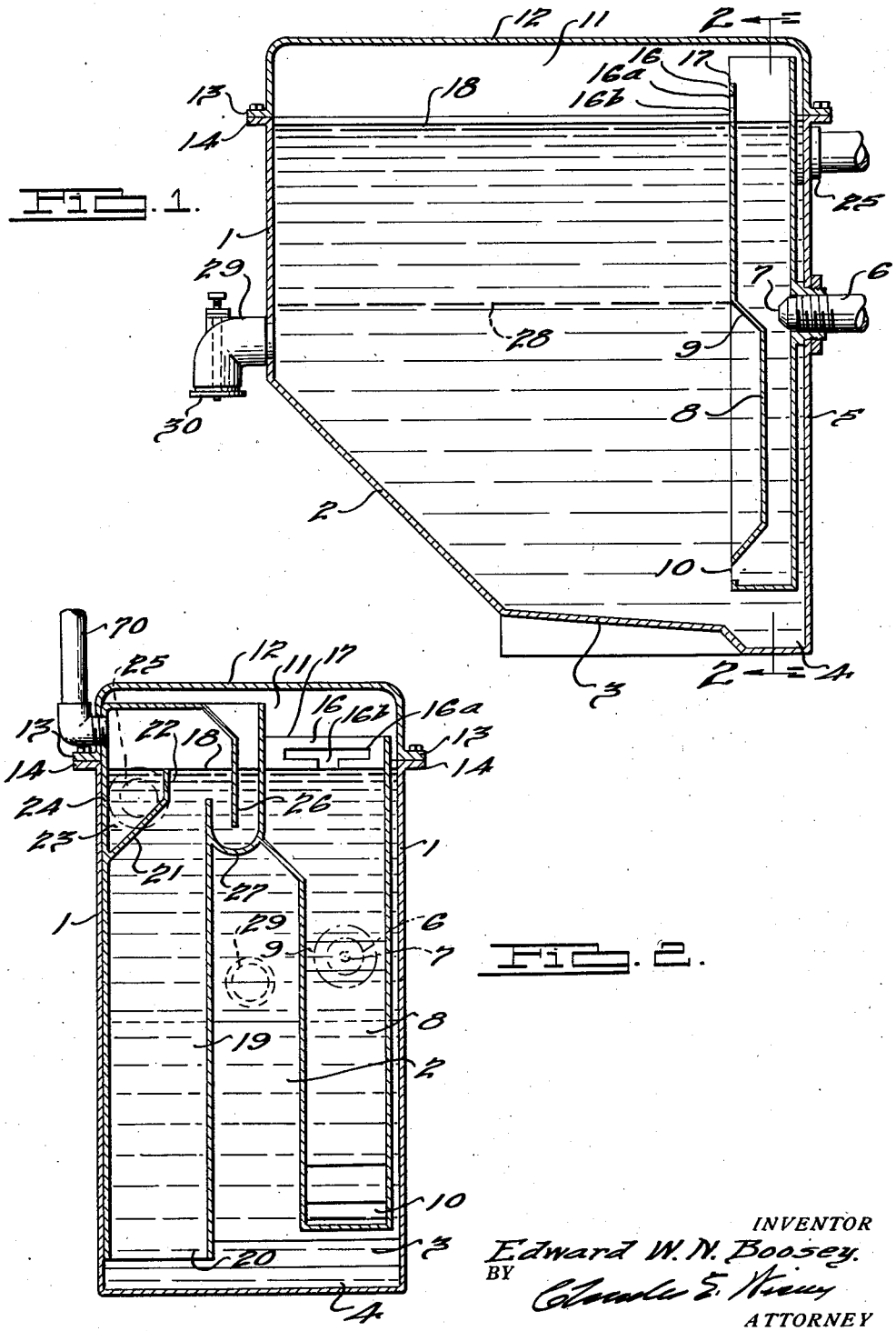

INVENTOR
Edward W. N. Boosey.
BY
ATTORNEY

Patented Jan. 6, 1942

2,268,854

UNITED STATES PATENT OFFICE 2,268,854

GREASE TRAP

Edward W. N. Boosey, Detroit, Mich.

Application December 27, 1940, Serial No. 371,907

7 Claims. (Cl. 182—9)

This invention relates to grease traps, the object being to provide a new and improved structural arrangement of parts of such character and relationship that the oils and greases are caused to rise to the surface of the liquid within the trap and are prevented from passing to the outlet and in association with such an arrangement, the provision of an air space at the upper end of the trap body which is automatically placed in communication with the outlet under certain pressure of gases therein and in which discharge of greases to the outlet is prevented under normal operating conditions.

More specifically, the invention seeks to provide a construction in which there is provided a conduit including a secondary trap open to the air space at one end and at the opposite end to the outlet below the normal liquid level therein which normally is maintained at a point above the uppermost point of the outlet.

While the invention may be embodied in several structural forms as hereinafter stated, it is pointed out that in any of the possible structural forms embodying the invention, there is an inlet conduit leading into the trap below the normal liquid level therein and into a vertical inlet column of such construction that the tendency of the greases to rise is increased by the velocity of flow thereinto from the inlet conduit and the heavier liquids falling to the bottom of the inlet column and the greases rising to the top thereof.

The outlet is positioned near the top of the body, means being provided to maintain a liquid level above the uppermost point of the outlet and a trap member opening to the air space above the said liquid level and to the outlet conduit below the liquid level so that under a condition of certain pressure in the air space at the top of body the liquid within the trap is discharged therefrom and the air in the air space flows to the vent to the air space at the top of the outlet column.

These and various other novel features of the invention are hereinafter more fully described and claimed, and the preferred form of a grease trap embodying my invention is shown in the accompanying drawings in which—

Fig. 1 is a vertical longitudinal section of my improved trap showing the inlet and discharge columns at one end thereof.

Fig. 2 is a section taken on line 2—2 of Fig. 1 through the said inlet and outlet columns and showing the secondary trap arrangement opening to the air space.

Figure 3:
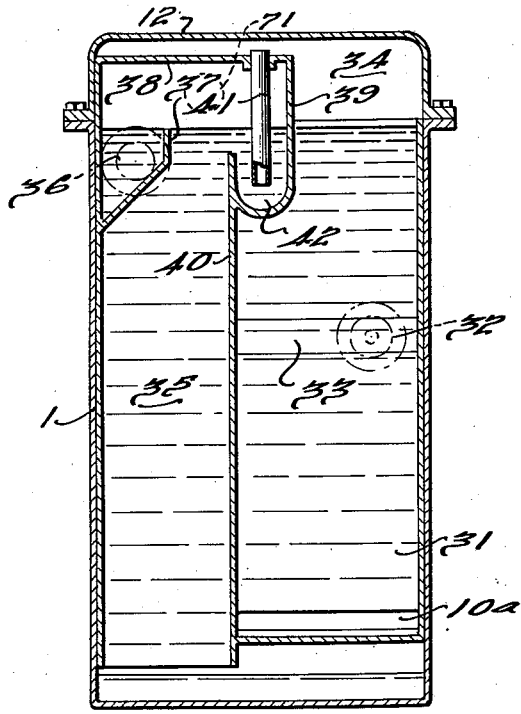
Fig. 3 is a sectional elevation similar to that shown in Fig. 2 and showing an alternative form of construction.

The trap in its preferred form is shown in Figs. 1 and 2, it having a body 1 flanged at the upper end, a sharply inclined wall portion 2 and a bottom 3 slightly inclined to the horizontal and opening to a lower recess 4 at one end of the trap. The vertical wall 5 of the trap has a threaded aperture to receive an inlet conduit 6 at the inner end of which there is a reduced diameter portion 7 providing a central aperture through which the inflowing liquid is caused to flow as from a nozzle. This inlet member opens into the vertical inlet column 8 which is of greater width at its upper end than it is below the inlet and the inner wall 9 therebetween is inclined to the vertical and so positioned that the flow of liquid passing through the inlet 7 strikes the inclined surface which tends to throw the liquid upward so that the greases, which have an inherent tendency to rise in the liquid, are started to flow in an upward direction while the heavier liquids pass downwardly through the bottom portion of the conduit and discharge through an aperture 10 which discharges horizontally over the bottom portion 3 of the casing and any foreign matter of greater specific gravity than water falls to the bottom and tends to flow into the recess 4. The inlet column 8 opens at its upper end to an air space 11 formed by providing a cover member 12 which is flanged at its lower end 13 and secured to the flange 14 at the top of the trap body.

The walls forming the air space provide a chamber normally sealed to atmosphere and the upper end 17 of the inlet column opens to the air space, it having a wall 16 on one side terminating below the upper end 17 providing for discharge of liquid thereover above the normal liquid level indicated at 18. I have also provided an opening 16ª in the wall 16 below the upper edge having a portion 16ᵇ at the normal level determined by the wall 22 at the outlet as hereinafter described. This opening 16ª provides for flow of the lighter liquids on the surface of the inlet column through the said wall to the surface of the liquid in the body of the intercepter.

The vertical outlet column 19 is located parallel with the inlet column and at the same end of the grease trap conduit and both columns are preferably formed separately from the trap body and are supported within the intercepter body which may be metal or concrete by the hubs opening through the wall 5 for connection with the respective inlet and outlet conduits. The outlet column is open at the bottom 20 to the interior of the body and preferably somewhat below the lower end of the inlet column which is also open to the trap body. It will here be noted that at the lower end the water is discharged horizontally across the bottom thus giving opportunity for any greases remaining in the liquid to rise therein before it may pass into the outlet. The outlet column at the top is provided with an inwardly inclined portion 21 and an upwardly extending vertical portion 22 forming a space 23 between the said wall portions 21 and 22 and the outer wall 24 of the trap body. In this space 23 there is provided a threaded hub 25 to which an outlet conduit (not shown) may be connected. The top edge of the wall 22 is above the uppermost point of the outlet so that the liquid level in the trap is normally maintained at the line 18.

The outer wall 24 of the trap body is continued upwardly above the flange 14 and into the air space and thence turned downwardly as indicated by a depending portion 26 parallel with the wall portion 17 of the inlet column which is cupped at the bottom as at 27 to receive the lower edge of the wall 26. This cup shaped portion and the two walls 27 and 26 provide a conduit opening at its upper end to the air space at the bottom and including a trap at the bottom opening to the outlet column below the liquid level.

By the arrangement of the parts described, liquid will flow into the trap from the inlet and will normally rise to the level of the upper edge of the wall 22 shown in Fig. 2. Greases discharging into the body from the inlet, being lighter than the water in the trap, will float on the surface of the liquid in the body but the outlet 25 is sealed to flow of oils and greases thereinto. The upper open end 17 of the conduit having the secondary trap 27 is above the flow level to which liquid may rise in the air space on each flushing of the trap and the liquid falls to normal level indicated by the line 18 after each flushing. The grease accumulating on the water may fall to the dotted line position 28 in Fig. 1 or below and may be drawn off by an oil outlet 29 having a closable valve 30. Thus when a certain amount of grease has accumulated on the water, it may be withdrawn through the conduit 29.

By the arrangement shown, any tendency of the contents of the body to be siphoned through the outlet will be prevented as soon as the trap 27 is freed of liquid and thus air which is under some pressure will pass directly to the outlet from the air space through the trapped conduit and break the siphon.

As previously stated, the structure may be varied in form, one variation being shown in Fig. 3 in which the inlet column is indicated at 31 to which the inlet column 32 discharges against an inclined surface 33 similar to the surface 9 of the form shown in Fig. 1. This column has an opening 10a at its bottom similar to the opening 10 of Fig. 1 and is open at its upper end to the air space 34. Formed integrally with the inlet is an outlet column 35 having an outlet opening 36 to which an outlet conduit is connected in the same manner as the arrangement shown in Fig. 2 and the upper edge of the wall 37 determines the liquid level. In this arrangement, there is an upper wall 38 of the outlet column which extends toward the inlet column and has an integral downwardly projecting portion 39 and continuing on a U curve to association with the inner wall 40 separating the inlet and outlet columns. In this upper wall 38 is provided a hub to receive a tube 41 open to the air space at its upper end and extending into the U curve and providing therewith a secondary trap 42. The function of the structure of Fig. 3 is substantially identical with that of the structure shown in Figs. 1 and 2.

Figure 4:
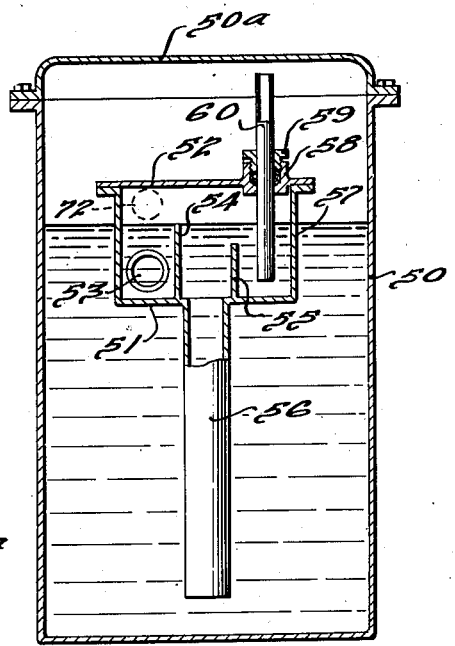
Fig. 4 is an elevation partly in section showing a further alternative form of construction.
Figure 5:
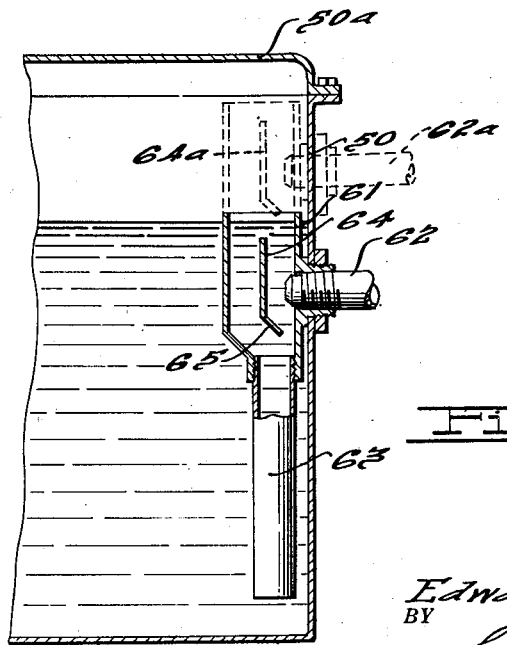
Fig. 5 is a vertical section of the inlet column of Fig. 4.

A further alternative structure is shown in Figs. 4 and 5 in which the same principle of operation of the grease intercepter in respect to the prevention of siphonage and the discharge of greases to the surface of the liquid in the container, prevention of grease passing to the outlet, and the maintenance of minimum water level are attained. In the structure of Figs. 4 and 5, the body of the intercepter is indicated at 50 which has a removable cover 50a permitting access to the interior thereof and which is sealed to the top of the intercepter body as in the previous structures described. The particular form of intercepter body is not so material—that is, it may be square or round or longer on one side than the other. Whatever the form of the body may be, there is provided an outlet column which is formed of the box like structure 51 having removable and sealable cover 52 at the upper end. The outer wall of the body has an outlet opening 53 which opens to the interior of the box like member or receptacle 51. In this receptacle there is a dividing wall 54 terminating at a point above the uppermost point of the outlet which determines the normal liquid level in the same manner as the wall 22 of the structure shown in Fig. 2. There is also a parallel wall 55 terminating below the normal liquid level and between these walls 54 and 55 the bottom of the receptacle portion 51 has preferably integrally therewith a tubular conduit 56 having its lower end spaced from the bottom of the body.

The wall 55 is spaced from the end wall 57 of the receptacle 51 and the cover member 52 is provided with an apertured threaded hub 58 to receive a packing nut 59 and securing the tube 60 therein to receive a packing nut 59 and securing the tube 60 therein, the upper end of which leads nearly to the top of the intercepter body 50 and the lower end of which is spaced from the bottom of the receptacle 51 and in conjunction with the wall 55 provides a secondary trap which is filled with liquid from the tubular member 56 of the outlet column. This arrangement functions in identically the same manner as the structures indicated in Figs. 2 and 3 and indicated another possible structural variation of the invention herein disclosed. The inlet column 61 of Fig. 5 is formed integrally with another and preferably opposite wall of the trap body 50 and this inlet column 61 has a threaded hub to receive an inlet 62. The column 61 is open at its upper end at a point above the normal liquid level and the lower end terminates adjacent the bottom of the body 50. The upper portion of the member 61 is of greater width than the lower tubular portion 63 and in this portion of greatest width is placed a baffle plate 64, the upper portion of which is substantially parallel with the longitudinal axis of the portion 51 and has an outturned lower flange 65. This arrangement functions much after the manner of the arrangement of the inlet column of the structure previously described in that the flow from the inlet conduit 62 to the lower member 63 of the inlet column is restricted thus giving opportunity for greases to rise to the surface to pass out the open end above the normal liquid level into the main body 50 of the trap.

Either of the devices shown would function without the use of such a member as, for instance, the member 9 of Fig. 1 or like portion 33 of Fig. 3 in that the inlet columns in each case are of such length that the greases are given some opportunity to rise to the surface of the liquid in the column but such baffles assist in separation of the greases from the liquid while in the inlet column. A further opportunity exists for separation of the liquid in the body of the trap as the inlet portion 63 and outlet portion 56 of the inlet and outlet columns are spaced some distance apart to provide for a time interval for the greases to separate prior to the liquid passing to the outlet column.

From the several structures shown, it will be evident that the invention provides a unique means for maintenance of the liquid level, separation of greases from the remainder of the liquid and the means including a sealed air space which opens to the outlet member below the liquid level so that upon a tendency to siphonage liquid from the grease trap through the outlet the liquid level in dropping below the uppermost point of the wall of the outlet of the secondary trap opens the outlet to the air space to which the upper end of the inlet column is open. In neither case is it possible under normal conditions for the greases floating on the surface of the water in the body to pass to the outlet.

In the continued operation of the grease trap shown in either of the drawings, as the greases accumulate on the surface, the actual water level in the body of the trap tends to fall and therefore preferably with either of the devices shown, a manually controlled grease outlet such as that indicated at 29 and 30 is utilized permitting the greases to be drawn off from the trap and thus eliminate the possibility of the trap becoming clogged with grease.

The reduced diameter portion of the inlet having a central aperture 7 as hereinbefore described provides for flow adjustment, the aperture varying in size depending upon the gallons per minute flowing through the inlet conduit and is usually made as an insertible end threading into the hub for the inlet conduit at the forward end of the conduit as shown in Fig. 1. This aperture will vary in diameter, depending upon the height of the inlet conduit and it is also pointed out that while the connection of the inlet conduit to the inlet column is below the water level in the several forms herein shown, the invention is not restricted to such specific positioning of the inlet as it may in some constructions as required for different installations be above the liquid level.

It is desirable, however, that a deflector of some form, as for instance the deflector 9 of Fig. 1, should be provided for causing the inflowing liquid to initially flow upwardly. It is further pointed out that it may be desirable to vent the upper end of the outlet column above the flow level to atmosphere and for this purpose I have shown a vent line at 70 in Fig. 2. This vent is sealed to the air space and to the inlet column by means of the trap at 27. This vent to air space at the upper end of the outlet column may be applied to any of the forms of structure herein shown as indicated by dotted lines 21 in Fig. 3 and 72 in Fig. 4. In either case, there is provided an air relief opening to the vented space below the liquid level therein. It is also pointed out that while I have shown the inlet conduit as discharging to the body below the liquid level thereof, the invention is not confined to such position of the inlet conduit as it may be connected to the body to discharge thereinto above the liquid level as shown by dotted lines in Fig. 5. In this dotted line structure, the inlet is indicated at 62ª and the baffle 64ª is positioned in respect to the inlet conduit 62ª substantially as shown providing a restricted area between the lower edge of the baffle and the side wall of the inlet column which restricts the flow toward the bottom of the inlet column and causes a large proportion of the material flowing from the inlet to pass over the top of the column and baffle.

By the described arrangement, the inlet is in a dry condition between flushings and flow from the inlet into the body of the intercepter is not restricted by the liquid therewithin. For this reason, the water flowing through the inlet when arranged in the dotted line position discharges against the baffle with a greater force than is the case when the inlet is placed in the full line position as shown in Fig. 5. It is to be understood of course that, with the inlet 62ª at the dotted line position and the baffle 64ª associated therewith, the inlet column would be free from baffle and of an inlet connection therebelow shown in full lines.

It is further pointed out that while the secondary trap between the inlet and outlet columns as shown in Figs. 2, 3 and 4 would in many cases provide a sufficient vent for the outlet column, the outlet members are often so constructed as to have a considerable fall and the secondary traps which provide a vent to the air space at the upper end of the intercepter body may be insufficient to prevent siphonage. Therefore, the vent above described connected directly to the air space at the top of the outlet column is usually provided and thus the secondary traps function mainly as an air relief preventing a material accumulation of pressure of gases in the top of the body.

From the foregoing description, it is believed evident that the various objects and features are attained by the structures described, and that various changes in the structure may be made without departing from the spirit and scope of the appended claims.

Having thus fully described my invention, its utility and mode of operation, what I claim and desire to secure by Letters Patent of the United States is:

1. In a grease trap, a body having an open top, a cover member therefor and extending above the top, a substantially vertical inlet column provided interiorly of the device and at one end and an outlet column parallel therewith at the same end, the inlet column having an opening at its bottom to said body and having an opening at the top to the air space, said outlet column having an opening for connection of a conduit therewith and having a chambered portion provided with a wall extending to above the uppermost point of the outlet and determining the normal liquid level in the body, and a conduit including a trap having an open upper end in the air space above the usual liquid flow level and the opposite end opening to the outlet column below the normal liquid level, the arrangement providing an air chamber normally sealed to atmosphere and opening to the outlet by siphonage of the trap.

2. In a grease trap, a body having an inlet and an outlet opening in one of its walls, the inlet being below the outlet and in horizontally spaced relation, a column forming the outlet conduit within the body and open at its lower end to adjacent the bottom of the body, said outlet conduit having an inner wall providing a recess therewithin open at its upper end to the column and the outlet opening being below said upper end of the recess whereby the wall forming the recess determines the normal liquid level in the body and providing an air space thereabove normally sealed to atmosphere, said outlet column having a portion thereof extending into the air space, a trap opening at one end to the outlet column below the normal liquid level therein and at the opposite end to the air space above the liquid level, an inlet column open at its bottom end adjacent the lower end of the body and arranged to discharge liquid laterally across the body above the bottom and initially in a direction away from the open lower end of the outlet column, said inlet column being open at the upper end permitting discharge of liquid therefrom to the air space at above the normal liquid level and below the flow level, and an inlet conduit discharging to the inlet column at a point between its upper and lower ends.

3. In a grease trap, a body, an inlet and an outlet column vertically arranged in parallel relation interiorly at one side of the body, means associated with the outlet for determining the normal liquid level in the body and providing an air space thereabove, an inlet conduit opening to the inlet column below the liquid level in the body, the inlet column being open at its upper end to said air space and open at the bottom adjacent the bottom of the body, a deflector means in the said column tending to deflect liquid flowing thereinto from the inlet conduit toward the upper end of the column, the outlet column having a chamber on one side having an outlet and provided with a wall extending above the uppermost point of the outlet for determining the normal liquid level in the body, said outlet column having an opening at the bottom for flow of liquid thereinto, and a conduit having the form of a trap, one end of which is open at one end to the air space above the usual flow level and at the opposite end to the outlet column below the normal liquid level.

4. In a grease trap, a body having an inlet and an outlet column vertically positioned therein side by side at one side of the body, an inlet conduit opening to the inlet column below its upper end, and an outlet conduit opening to the outlet column at a point above the level of the inlet, means in the outlet column associated with the said outlet opening providing for maintenance of a normal liquid level above the uppermost point of the outlet opening, and an air space thereabove, the lower end of the outlet column being open to the body at a point adjacent the bottom of the body and the inlet conduit having an opening at its lower end to the body at a distance above the lower end of the outlet, said inlet column discharging to the top of the body above the normal liquid level therein and the outlet column being sealed to the air space at the top, a trap opening at one end to the outlet column at a point below the normal liquid level and opening at the opposite end to the air space and thus to the inlet, the vertical distance of the inlet end of the trap below normal liquid level determining the difference in pressure between that of the outlet under flow condition and of the air space required to discharge the liquid from the trap and open the outlet to the air space and inlet column.

5. In a grease trap, a body having an inlet column and an outlet column vertically positioned in horizontally spaced relationship therewithin, an inlet and an outlet conduit respectively connected with the said inlet and outlet columns, a receptacle to which the upper end of the outlet column discharges, a partition in said receptacle for maintaining a normal liquid level above the uppermost point of the outlet opening, the air space above said normal liquid level being sealed to atmosphere, said inlet column opening to the said air space above the normal liquid level, a second partition in the receptacle on the opposite side of the opening of the outlet column to the receptacle from that of the first partition and terminating below the liquid level, and a tube opening at its lower end to the space between said last named partition and adjacent wall of the receptacle and its upper end to the air space above the flow level.

6. In a grease trap, a body having an inlet and an outlet column vertically positioned therein, each respectively connected with an inlet and an outlet conduit, a cover for the said body providing an air space above the normal liquid level in the body sealed to atmosphere and to which the upper end of the inlet column is open, a trap between the inlet and outlet columns having one end open to the said air space above the liquid flow level of the body and to the outlet column below the normal liquid level, the outlet column extending to above the liquid level providing an air space separate from the air space of the body, and a vent to atmosphere for said air spaces of the outlet column.

7. In a grease trap, a body having an inlet and an outlet column vertically positioned therein, each respectively connected with an inlet and an outlet conduit, the body having a cover sealed thereto, means in the outlet column for determining the normal liquid level in the trap body and inlet and outlet columns, the inlet column being open at the top to the air space in the body above the liquid level and the outlet column having a portion extending above the liquid level and providing an air space therein separate from the air space of the body, a secondary trap between the inlet and outlet columns opening at one end to the outlet column below the liquid level therein and at the opposite end to the air space at the top of the body, the outlet conduit being below the liquid level in outlet column, and a vent to atmosphere connected with the upper end of the outlet column above the liquid level.

EDWARD W. N. BOOSEY.